United States Patent [19]

Asano et al.

[11] 4,042,486

[45] Aug. 16, 1977

[54] PROCESS FOR THE CONVERSION OF PITCH INTO CRYSTALLOIDAL PITCH

[75] Inventors: Kiro Asano, Kakizaki; Humio Tamura, Hino; Tsuyoshi Saito, Tokyo; Yoshio Kawai, Tokyo, all of Japan

[73] Assignee: Kureha Kagaku Kogyo Kabushiki Kaisha, Tokyo, Japan

[21] Appl. No.: 665,620

[22] Filed: Mar. 10, 1976

Related U.S. Application Data

[63] Continuation-in-part of Ser. No. 588,024, June 18, 1975, abandoned, Continuation-in-part of Ser. No. 589,592, June 23, 1975, abandoned.

[30] Foreign Application Priority Data

June 24, 1974 Japan .................................. 49-71257

[51] Int. Cl.$^2$ .............................................. C10C 3/00
[52] U.S. Cl. .................................... 208/44; 264/29.1; 208/39; 106/284
[58] Field of Search ...................... 208/39, 44; 264/29; 106/284

[56] References Cited

U.S. PATENT DOCUMENTS

| | | |
|---|---|---|
| 3,812,240 | 5/1974 | Whittaker et al. .................... 423/449 |
| 3,974,264 | 10/1976 | McHenry ........................... 423/447.4 |

*Primary Examiner*—Veronica O'Keefe
*Attorney, Agent, or Firm*—Lane, Aitken, Dunner & Ziems

[57] ABSTRACT

Crystalloidal pitch is obtained by subjecting solid pitch particles measuring not more than 5 mm in cross-sectional equivalent diameter to a treatment to prevent cohesion and subsequently bringing the cohesion-proof solid pitch particles into contact with a non-oxidative gas at temperatures of from 350° C to 550° C while maintaining a gas flow rate sufficient to provide a suspension wherein the gas constitutes at least 30% by volume. The crystalloid pitch is useful as a precursor for various carbon products.

22 Claims, 5 Drawing Figures

PROCESS FOR THE CONVERSION OF PITCH INTO CRYSTALLOIDAL PITCH

CROSS-REFERENCE TO RELATED APPLICATIONS

This application is a continuation-in-part of our earlier U.S. applications, U.S. Ser. No. 588,024, filed June 18, 1975 and U.S. Ser. No. 589,592, filed June 23, 1975 both of which are entitled "PROCESS FOR THE CONVERSION OF PITCH INTO CRYSTALLOIDAL PITCH", both now abandoned.

FIELD OF THE INVENTION

This invention relates to a process for the conversion of plain pitch into crystalloidal pitch, and more particularly to a process for the production of the so-called crystalloidal pitch which serves as the precursor for carbon products.

BACKGROUND OF THE INVENTION

Generally, ordinary pitch has an amorphous structure. When this pitch is heated to temperatures of about 350° C to 550° C in an inert gas atmosphere, the molecules of the pitch undergo a thermal polycondensation reaction and become oriented to give rise to a kind of optically isomeric liquid crystal within the pitch. This liquid crystal is otherwise called a mesophase. The condition in which the mesophase occurs and grows can be observed with the aid of a polarizing microscope. The mesophase consists of pitch-forming aromatic molecules which have been oriented and associated together through their own interaction. The mesophase can be observed as anisotropic spherules under a polarizing microscope. A pitch of the type which contains such a mesophase is referred to as "crystalloidal pitch."

In recent years, it has been reported that shaped articles of carbon (graphite) having high density, high strength and isotropy can be produced by subjecting the crystalloidal pitch or mesophase, obtained by solvent extraction from the crystalloidal pitch in a powdered from, to compression molding and baking the compression molded articles. Since the crystalloidal pitch has heretofore been produced by heating and melting ordinary pitch in a container, the viscosity of the pitch is gradually increased during conversion with resulting nonuniformity of temperature distribution in the pitch. Thus the conversion of the pitch into a homogeneous crystalloidal pitch is by the prior art method difficult to attain. It is, therefore, impossible to consistently obtain a crystalloidal pitch with a constant mesophase content. To obtain a crystalloidal pitch having a high mesophase content, i.e., to obtain a mesophase of high purity, it has heretofore been customary to extract the mesophase fraction from the crystalloidal pitch containing some by use of a solvent such as quinoline or anthracene oil. This conventional process has the disadvantage that the raw pitch and the solvent must be used in large quantities and the solvent must be recovered after use.

SUMMARY OF THE INVENTION

It is, therefore, an object of the present invention to provide a novel process capable of consistently producing crystalloidal pitch of a prescribed mesophase content. This and other objects of the present invention will become apparent from the following description of the present invention.

The present invention is characterized by the steps of subjecting solid pitch particles measuring not more than 5 mm in cross-sectional equivalent diameter to a treatment for protecting the solid pitch particles against cohesion, thereafter bringing the thus treated solid pitch particles into contact with a non-oxidative gas at temperatures of from 350° C to 550° C to form a suspension of pitch particles wherein the gas constitutes not less than 30% by volume.

The term "cross-sectional equivalent diameter" is used in the specification on the assumption that the solid pitch particles occur in definite shapes such as spheres, cubes and rectangular parallelepipeds, and the areas and volumes of the particles of the assumed shapes are equivalent to those of the actual particles. The term is used to refer to the diameter of the central cross sections of the hypothetical particles.

DETAILED DESCRIPTION OF THE INVENTION

As the raw material for the present invention, various types of pitch such as, for example, coal pitch, petroleum pitch and any pitches produced as by-products in chemical industries can be used. For ease of handling and for smooth operation such as the fusion-proofing treatment described below and heat treatment, it is desirable to use pitch having a softening point of not less than about 70° C. By the term "softening point" used herein is meant the temperature at which one gram of a pitch sample placed in a cylinder having a cross-sectional area of 10 mm and provided at the lower end thereof with a nozzle 1 mm in diameter begins to flow out of the nozzle when a load of 10 kg/cm$^2$ is applied to the specimen and at the same time the cylinder is heated externally to elevate the temperature of the specimen at a temperature increase rate of 5° to 15° C/min. Such an apparatus for softening point determination is the flow tester made by Shimadzu Seisakusho Ltd. In the present invention, a given pitch is converted into solid pitch particles not more than 5 mm in cross-sectional equivalent diameter for the purpose of producing crystalloidal pitch. The preparation of the solid pitch particles is accomplished simply by crushing or molding the pitch raw material. It is essential that the solid pitch particles have a cross-sectional equivalent diameter of not more than 5 mm, preferably not more than 3 mm. Those particles having a cross-sectional equivalent diameter of 5 mm or more are not suitable, for they tend to effervesce and undergo thermal deformation in the course of the heat treatment for conversion into a crystalloid. The shape of the solid pitch particles is not critical. They may assume shapes such as, for example, spheres, fibers, cylinders and even indefinite shapes. In the preparation of the solid pitch particles, the pitch used as the raw material is preferably molded in the form of spheres if its softening point is low, and when the pitch has a high softening point it may be crushed, if necessary. The pitch used as the raw material may be molded in the form of fibers for the purpose of producing carbon fibers.

The present invention requires the solid pitch particles to be treated by one of the procedures (1), (2) or (3) described below so as to protect the individual pitch particles against mutual fusion or cohesion.

1. Fusion-proofing by coating the surface of the solid pitch particles with a metal, metal salt, thermosetting resin, etc.:

Where the coating is made with a metal, adoption of a conventional chemical plating method will suffice. By plating, the surface of the solid pitch particles can easily be coated with a metal such as copper, chromium, nickel or silver. Coating with a metal salt can be accomplished by immersing the solid pitch particles in an aqueous solution of the metal salt and then drying the impregnated pitch particles. The metal salts which can be used for this purpose are chlorides of such metals as nickel, iron and aluminum. Such a chloride functions as a catalyst in the polycondensation of pitch by the heat treatment described below and consequently serves to harden the surface of the solid pitch particles, making it possible to prevent the solid pitch particles from cohering. Coating with a thermosetting resin can be accomplished by forming a coat of a thermosetting resin such as phenol resin, furan resin or epoxy resin on the surface of the solid pitch particles and subsequently allowing the coat to harden.

2. Fusion-proofing treatment effected by formation of an oxidized coat on the surface of the solid pitch particles:

This treatment can be accomplished by simply allowing the solid pitch particles to come into contact with an oxidative gas selected from among oxygen, ozone, sulfur oxides, nitrogen oxides (for example, $N_2O_5$, $N_2O_3$ and $NO_2$) and halogens, or a mixed gas consisting of one or more oxidative gases and an inert gas selected from among nitrogen, argon, steam and complete combustion gases at room temperature or a temperature higher than room temperature but lower than the softening point of the solid pitch particles. Alternatively, the formation of an oxidized coat on the surface of the solid pitch particles can be produced by the so-called wet oxidation method which is effected by immersing the solid pitch particles in a solution of an oxidizing agent such as hydrogen peroxide, chlorate, hypochlorite, perchlorate, nitric acid, ferric chloride, perchromate, mixed acid, permanganate or peracetate. The procedure for formation of the oxidized coat should be conducted at a temperature lower than the softening point of the solid pitch particles, no matter which of the aforementioned procedures may be adopted. Since the softening point of the solid pitch particles rises in proportion to the extent of the oxidation, however, the temperature of the reaction system may be allowed to rise to the level of 350° C (the temperature at which the solid pitch particles begin to undergo conversion into a crystalloid) without the pitch particles becoming mutually fused or deformed. Particularly in the case of solid pitch particles having a large cross-sectional equivalent diameter, such elevation of temperature proves advantageous in the sense that the time of treatment can be curtailed. It is difficult to define the time required for the formation of the oxidized coat, because the time will vary to a great extent depending on the particular kind of oxidizing agent and the magnitude of the treatment temperature. Generally, the time required ranges from several minutes to several hours.

3. Fusion-proofing treatment effected by removing low-boiling components or low-melting components from the solid pitch particles by extraction:

This treatment can be effected by extraction with a solvent which is capable of effectively and selectively dissolving the low-boiling components or low-melting components of the pitch particles and which is substantially incapable of dissolving other pitch components. Examples of solvents which meet such requirements are acetone, methylethyl ketone, benzene, toluene, hexane, heptane, cyclohexane, methyl alcohol, chloroform and carbon tetrachloride which may be used singly or in the form of a mixture of two or more members. Proper selection of a solvent from the aforementioned group of solvents, will depend on the nature of the pitch. By extraction, there can be obtained solid pitch particles of residual pitch components having a softening point of from 340° to 400° C and insusceptible to mutual fusion or cohesion. When solid pitch particles having a softening point of not more than 340° C are obtained, the individual pitch particles are not protected against mutual fusion. It then becomes necessary to subject the solid pitch particles resulting from the extraction treatment, to a treatment wherein the solid pitch particles are allowed to stand in an atmosphere of a substantially non-oxidative gas at temperatures between the softening point and the flow point of the solid pitch particles for a period of from several minutes to a few score minutes (this treatment will be referred to hereinafter as "preliminary heat treatment"), and subsequently to subject the preliminarily treated particles to the procedure of (2). This preliminary heat treatment serves the purpose of softening and shrinking the surface of the solid pitch particles to a slight extent without causing any deformation of the pitch particles and consequently, closing the pores on the surface and uniformizing the surface condition. Thus, it enables the solid pitch particles to retain their shape in good order in the subsequent regular heat treatment which is described below.

In selecting between procedures (1), (2) and (3) described above it is wise to take into due consideration such factors as the shape of the solid pitch particles, the property of pitch itself and the extent to which the conversion of pitch into a crystalloidal pitch as the final product is effected. The fusion-proofing treatment may be effected by adopting the procedures of (2) and (3) in combination. In the case where solid pitch particles happen to contain low-boiling components or low-melting components to some extent, the treatment of the solid pitch particles by the procedure of (1) or (2) alone may, at times, fail to satisfactorily attain the object of the fusion-proofing treatment. Besides, when solid pitch particles which have been treated by the procedure of (1) or (2) are subjected to the heat treatment to be described hereinbelow, the particles yield to an undesirable phenomenon of effervescence and cause a degradation in the quality of the crystalloidal pitch to be finally obtained. When the treatment by the procedure of (2), for example, is carried out thoroughly for the oxidation to proceed amply into the solid pitch particles so that the object of the fusion-proofing treatment may be fully attained on the solid pitch particles containing low-boiling components or low-melting components, these solid pitch particles are converted into oxidized pitch particles and consequently throw an obstacle in the way of the heat treatment to be given for conversion into a crystalloidal pitch. Where the treatment by the procedure of (2) is given to such solid pitch particles as contain a certain amount of low-boiling components or low-melting components, therefore, it is preferable to subject these pitch particles to the treatment of procedure (3) either before or after the treatment of procedure (2) so as to strip these components from the pitch particles by extraction. This additional treatment ensures success of the fusion-proofing treatment and facilitates the heat treatment for conversion of pitch into a crystalloidal pitch.

Subsequently, in the present invention the solid pitch particles, fusion-proofed as described above, are subjected to a heat treatment in which the pitch particles are contacted with a non-oxidative gas at temperatures of from 350° to 550° C while maintaining a "void ratio" of not less than 30% by volume. The term "void ratio" as used herein means the proportion occupied by the non-oxidative hot gas in a given volume of the dispersed system consisting of the solid pitch particles and the current of the hot gas. As long as the void ratio is not less than 30% by volume, the heat treatment can be conducted uniformly and smoothly in a short period of time. Examples of the non-oxidative gases which serve the purpose described above include nitrogen, argon, hydrogen, steam and complete-combustion gases. The dispersed system formed by keeping the solid pitch particles in contact with the non-oxidative gas may assume the form of a fluidized bed, a fixed bed or a perfect moving bed. The temperature at which the heat treatment described above is carried out should fall in the range of from 350° to 550° C, because the conversion of the solid pitch particles into a crystalloidal pitch is substantially unattainable where the temperature is below the lower limit of 350° C. On the other hand, the solid pitch particles undergo carbonization so abruptly as to hinder the proper conversion into the crystalloidal pitch where the temperature exceeds the upper limit of 550° C. The heat treatment time may be suitably selected in accordance with the temperature to be used. Generally, the time required is several hours at temperatures of from 380° C to 450°C. When the solid pitch particles are subjected to the heat treatment of the foregoing description, the mesophase forms and grows within the solid pitch particles, with the result that there is finally obtained a crystalloidal pitch.

According to the present invention, the solid pitch particles are heat treated by exposure to the current of a hot gas as described above. Because of the particular nature of the heat treatment, the time of treatment and the temperature of treatment can be freely changed so rapidly that the degree of conversion to a crystalloidal pitch can readily be adjusted as desired. Further, the present invention enjoys the advantage that because the solid pitch particles to be treated have a small size, the treatment can be accomplished with great rapidity and high productivity. Microscopically, precursors of various types suitable for isotropic to heterotropic carbon products can readily be produced by the process of the present invention by properly varying the shape of solid pitch particles used as the starting material. Where the solid pitch particles are in the form of globules and are consequently isometric, the crystalloidal components (mesophase) occur and grow macroscopically in an isotropic arrangement. Where the solid pitch particles are in the form of fibers, the crystalloidal components occur mainly in the direction of the major axis. It is also possible to produce a carbon material of high density and high strength by preparing a carbon precursor capable of being sintered by adjusting the degree of crystalloid conversion, finely pulverizing the produced precursor, molding the resultant powder without use of a binder and baking the molded powder.

The crystalloidal pitch thus obtained according to the present invention can be used for the production of carbon and graphite products of unusually high quality and, therefore, can be used extensively in the field of electrical products, in the field of mechanical products such as seals and bearings, in the field of atomic power and in the field of chemical products such as impervious and anticorrosive containers, etc.

The present invention will be described more specifically below by reference to preferred embodiments of the invention. It should be noted, however, that the present invention is not limited in any way by these examples.

EXAMPLE 1

A petroleum pitch having a softening point of 100° C and a benzene insolubles content of 40% was molded into globules 0.5 mm in average diameter. The pitch globules thus molded were extracted with hexane at room temperature and further extracted with benzene at room temperature and thus stripped of about 25% by weight of their low-boiling components. After this treatment by extraction, the pitch globules showed a softening point of 330° C. Then, the pitch globules were heated to 350° C in a fluidized bed of a void ratio of 60% formed with a current of hot nitrogen gas supplied at a linear velocity of 30 cm/sec. When the temperature of the globules leveled off, air was introduced into the system to give an oxygen content of 4% in the current of hot gas so as to oxidize the surface of the pitch globules for a period of 10 minutes. The introduction of air was then discontinued and the system was elevated to 420° C at a temperature increase rate of 100° C/hour. At a temperature of 420° C, the system was allowed to stand for four hours, with the current of nitrogen gas continued. The crystalloidal pitch globules thus obtained were found to have a quinoline solubles content of 8% and a fixed carbon value of 93% and to possess a sintering property. These globules were pulverized to an average diameter of 10 $\mu$ and thereafter molded under pressure of 1 ton/cm$^2$ and finally graphitized. The graphite thus produced had a bulk density of 2.05, a bending strength of 110 kg/cm$^2$ and a porosity of 5%.

EXAMPLE 2

A pitch having a softening point of 270° C was prepared by distilling off the low-boiling fraction from the tar byproduced in the production of acetylene and ethylene by the thermal cracking of crude oil at elevated temperatures. This pitch was molded by melting to form pitch beads measuring 1 mm in average diameter.

The pitch beads were subjected to the fusion-proofing methods described below. Thereafter, the fusion-proofed pitch beads were converted into a crystalloidal pitch.

1. Fusion-proofing treatment by the wet oxidation method:

A 1% sodium hypochlorite aqueous solution (available chlorine concentration) was adjusted to pH 5.5 by addition of acetic acid. To the resultant solution the pitch beads were added in the amount of 50 g per liter and maintained at 40° C for two hours for oxidation. Then, the pitch beads were washed thoroughly with water and dried in a current of hot air at 100° C. Thereafter, the pitch beads were placed in an inert gas atmosphere in a rotary kiln operated at a rate of 30 rpm and were advanced therein through heating zones maintained at successively higher temperatures ranging from over 270° C to 550° C so as to have the temperature thereof elevated at a temperature increase rate of 180° C/hour. At various temperatures, the beads under treatment were sampled and tested for presence or absence of mutual fusion between individual beads and for degree of conversion into crystalloidal pitch. The degree of conversion to crystalloidal pitch was determined by dissolving 1 g of a given specimen in 100 g of quinoline, agitating the resultant solution at 40° C for 12 hours, passing the solution through a glass filter No. G-3 and weighing the insoluble fraction separated by this filtration. In this case, however, the quinoline insolubles contained in the raw material prior to the start of the conversion into the crystalloidal pitch were not regarded as part of the crystalloidal pitch. The amount of quinoline insolubles produced by the surface oxidation was negligibly small. Table 1 shows the relation between the temperature and the amount of crystalloidal pitch produced.

TABLE 1

| Specimen No. | Temperature at time of sampling | Fusion of individual beads | *Amount of crystalloidal pitch produced (wt %) | Shape of** crystalloidal pitch |
|---|---|---|---|---|
| 1 | 300° C | — | 0 | — |
| 2 | 350 | — | 15 | Spheres |
| 3 | 380 | — | 60 | Large Spheres |
| 4 | 400 | — | 80 | Coalescence of spheres |
| 5 | 450 | — | 89 | Flow pattern |
| 6 | 550 | — | 95 | Flow pattern |

*The values in this column represent the amounts of crystalloidal pitch formed as a quinoline insoluble fraction.
**As viewed in cross-section through a polarizing microscope.

Figure 1:
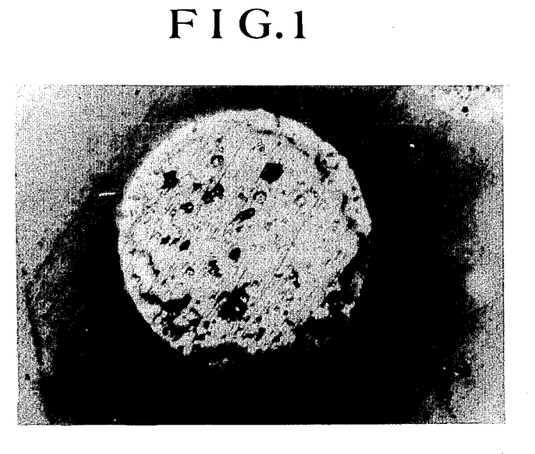
FIG. 1 is a photograph taken through a polarizing microscope of the cross-section of pitch beads which measured 1 mm in average diameter and which had undergone a heat treatment at 300° C.
Figure 2:
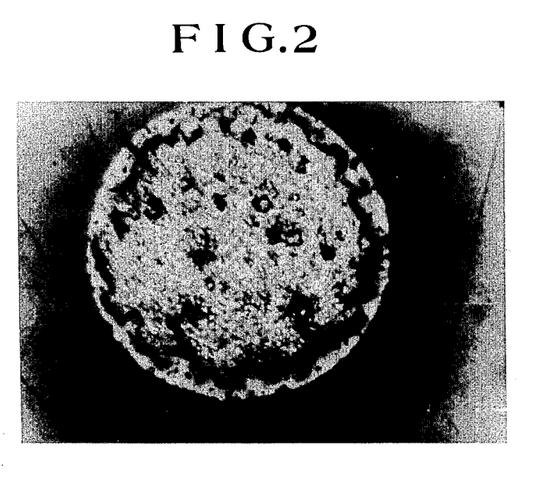
FIG. 2 is a photograph taken through a polarizing microscope of the cross-section of pitch beads which measured 1 mm in average diameter and which had undergone a heat treatment at 380° C.
Figure 3:
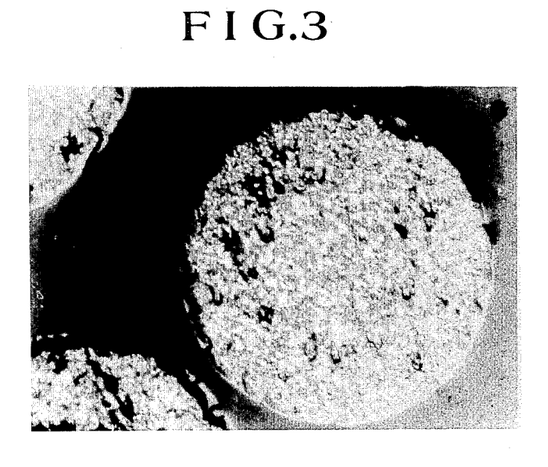
FIG. 3 is a photograph taken through a polarizing microscope of the cross-section of pitch beads which measured 1 mm in average diameter and which had undergone a heat treatment at 400° C.

As is evident from the foregoing results, the proper conversion to crystalloidal pitch can be accomplished by operating in the range of from 350° C to 550° C and a product can be obtained in any desired shape, ranging from crystalloidal globules to a fluid structure having individual crystalloidal globules combined into one continuous mass. FIG. 1 represents a photograph taken through a polarizing microscope of specimen No. 1, which is seen to be free from occurrence of mesophase. FIG. 2 is a photograph taken of specimen No. 3, which clearly shows occurrence of Spheres (mesophase) and the presence of a fusion-proofing coat. Specimen No. 4, the photomicrograph of which is shown in FIG. 3, was subjected to a heat treatment in an inert gas atmosphere at 2400° C and then tested for graphitization. The results were as follows: Specific gravity (as immersed in n-butanol) 2.15, LC (002), 280 A, d.002, 3.375 A.

2. Fusion-proofing treatment by air oxidation:

The same pitch beads as used in (1) above were fluidized in a current of hot gas ($N_2$) supplied at a rate of 50 liters/min. (gas void ratio 70%) and heated instantaneously to the neighborhood of the softening point of pitch. They were maintained at that temperature for 30 minutes. Thereafter, the introduction of air into the current of hot gas was started at a rate to give an oxygen content of 4% by volume in the current of hot gas so as to oxidize the surface of pitch beads for 2 hours. Then, the introduction of air was stopped. Again, in the current of $N_2$ gas alone, the pitch beads were heated to 400° C at a temperature increase rate of 180° C/hour. At 400° C, the beads were allowed to stand to determine the relationship between the duration of heating and the degree of conversion. Throughout this period, the heating of the system was controlled by adjusting the temperature of the hot gas ($N_2$), The results were as shown in Table 2.

Table 2

| Length of standing at 400° C (hr) | Amount of crystalloid formed (%) |
|---|---|
| 0 | 80 |
| 0.5 | 83 |
| 1 | 87 |
| 3 | 90 |
| 5 | 93 |

3. Fusion-proofing treatment by the chemical metal plating method (copper coat):

A mixture obtained by adding 8.5 ml of ammonium chloride solution (13N) to 100 ml of a 100 g/lit. copper sulfate solution was diluted with water to 1 liter. 50 g of pitch beads were introduced into the resultant solution and then 0.5 g of hydrosulfite and a small amount of Rochell salt was introduced to plate the beads at 26° C for 5 minutes. The plated beads were formed into a fixed bed having a gas void volume of 38% and heated at 380° C for 2 hours by a current of a complete-combustion gas containing no free oxygen for conversion into crystalloidal pitch. Consequently, there were obtained crystalloidal pitch beads showing substantially no sign of mutual fusion and having a crystalloidal content of 69%. The quinoline insolubles formed as a consequence of the plating treatment were not regarded as part of the crystalloidal content mentioned above. The plate formed on the surface had a thickness of about 1 $\mu$. When the crystalloidal pitch beads thus formed were treated in hydrochloric acid solution, the plate vanished completely leaving behind crystalloidal pitch beads of a refined quality. When 60 g of these crystalloidal pitch beads and 40 g of coal pitch (having a softening point of 70° C) were agitated together for thorough dispersion at 300° C for 2 hours, there was produced a crystalloidal pitch which had a softening point of 200° C and which was extremely easy to melt-mold. When this pitch was extruded through a nozzle 1 mm in diameter, the crystalloidal component thereof was observed under a polarizing microscope to be oriented in the direction of the major axis.

4. Fusion-proofing treatment by use of thermosetting resin:

A resol type phenol resin was diluted with methanol to a 1% solution. In this solution, the pitch beads were immersed so as to be coated with the phenol resin. The coated pitch beads were subjected to a heat treatment at 150° C for 30 minutes to thoroughly set the phenol coat. The coated pitch beads were then held in the form of a fluidized bed in a current of $N_2$ gas supplied at a rate of 50 liters/min. so as to elevate their temperature to 550° C at a temperature increase rate of 180° C/hour for the purpose of conversion. The crystalloidal pitch beads thus obtained were found to have undergone conversion while retaining their original form, though the individual beads were partly fused. The degree of conversion was found to be 98%. The quinoline insoluble fraction originating in the phenol resin was 2%.

5. Fusion-proofing treatment by use of metal salt:

In 1 liter of a methanol solution containing 2% nickel chloride, 50 g of pitch beads were placed. Then the beads were separated by filtration, dried in a current of hot air and thereafter heated in a fluidized bed to 390° C at a temperature increase rate of 90° C/hour. The beads were allowed to stand at 390° C for 5 hours. The degree of conversion was found to be 90%.

EXAMPLE 3

Figure 4:
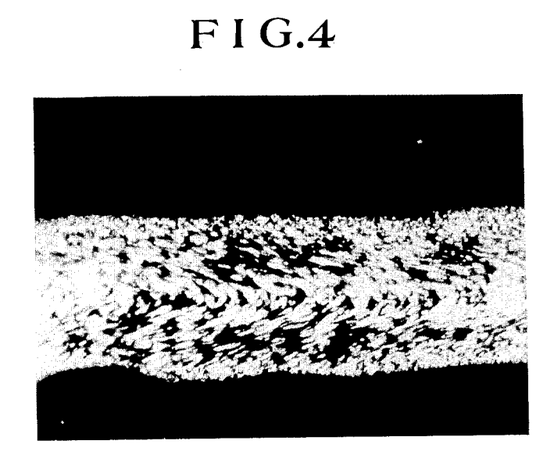
FIG. 4 is a photograph taken through a polarizing microscope of the longitudinal cross-section of pitch fibers which measured 100 $\mu$ in diameter and which had been treated in accordance with the present invention.
Figure 5:
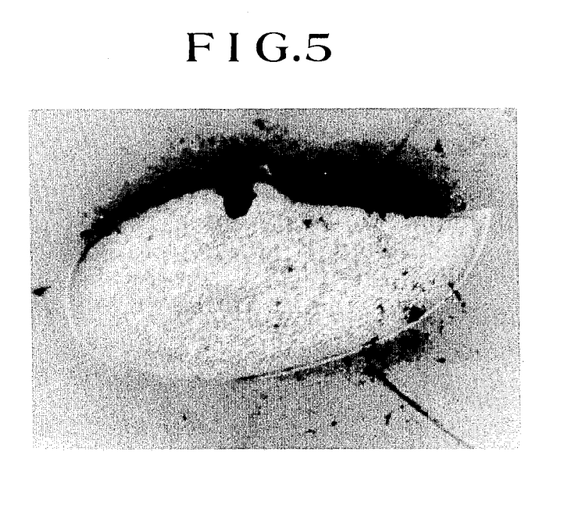
FIG. 5 is a photograph taken through a polarizing microscope of the cross-section of pitch fibers of FIG. 4 which had been treated in accordance with the present invention.

A pitch having a softening point of 290° C was prepared from a tar obtained by the thermal cracking of crude oil at elevated temperatures. The quinoline insoluble content of this pitch was found to be less than 1%. Absence of mesophase from this pitch was confirmed by observation with a polarizing microscope. This pitch was extruded by a melt-spinning machine at 350° C to produce pitch fibers 100 $\mu$ in diameter. The pitch fibers were packed in such a way as to leave a gas void ratio of 80% and a current of a nitrogen-air mixture (oxygen concentration of 4%) at 270° C was introduced upwardly through the packed mass of pitch fibers so as to uniformly oxidize the surface of the fibers for 30 minutes. The quinoline insoluble content formed as a consequence of this oxidation was found to be 10% by weight. The pitch fibers were then heated in an atmosphere of $N_2$ to 400° C at a temperature increase rate of 30° C/hour and allowed to stand at that temperature for five hours. The fibers obtained at the end of the 5-hour period had a crystalloidal content of 95%, with the crystals oriented in the direction of the fiber axis as is seen in the photograph of FIG. 4. FIG. 5 is a photograph showing a cross-section of such pitch fibers. This photograph shows that the crystals are oriented in the form of concentric columns relative to the axis of the fibers. The fibers were further subjected to a heat treatment in an argon atmosphere up to 2400° C without applying tension. When the resultant pitch fibers were tested by the ordinary method using X-rays, the degree of orientation was found to be 85%. These facts, as to the orientation of the fibers, are such as could be foreseen on the basis of carbon fiber technique of the past, but have been brought to light for the first time by the present invention.

EXAMPLE 4

A pitch having a softening point of 150° C was produced from so-called ethylene bottom oil obtained by the thermal cracking of naphtha at elevated temperatures. This pitch was melted at 200° C, dropped on a disk rotating at a high rate of speed to produce short fibers 0.5 mm in average diameter. Then, in a rotary kiln, the short fibers were instantaneously heated to 150° C with a current of steam and maintained at this temperature for five hours. After elimination of low-boiling components, introduction of air was started (to give an oxygen content of 8%) to oxidize the fibers for two hours. Then, the introduction of air was stopped. The fibers were heated in the steam up to 550° C at a temperature increase rate of 90° C/hour for the purpose of conversion. The crystalloidal content was found to be 95%. When the fibers were heated at 2400° C to be carbonized and graphitized in the argon current, there were obtained short fibers having an orientation degree of 90% and a specific gravity of 2.45. Observation under a polarizing microscope revealed that the thickness of the oxidized coat fromed on the fibers was about 20 $\mu$.

EXAMPLE 5

In a coal pitch (having a softening point of 78° C), 3% iron chloride was incorporated as a conversion accelerator. The resultant mixture was uniformly melted at 150° C and then allowed to cool. Thereafter, the resultant solid mixture was crushed with a hammer mill and then classified to produce particles having a particle size distribution in the range of from 5 mm to 1 mm. The particles were immersed in 6N nitric acid solution and treated therein at 60° C for 1 hour. Thereafter, the impregnated particles were heated to 450° C in the form of a fluidized bed having a void volume of 50%, with an inert gas current at a temperature increase rate of 30° C/hour for conversion. The degree of conversion was found to be 90%. The crystalloidal pitch particles thus obtained were crushed with a hammer mill, molded at room temperature under pressure of 600 kg/cm² and then baked and graphitized by the ordinary method. The results were as shown in Table 3.

Table 3

| Physical properties of graphite (20 mm in diameter × 10 mm in height) | |
|---|---|
| Bulk density | 1.90 |
| Porosity | 8.0% |
| Bending strength | 850 kg/cm² |
| Resistance | 25 × 10⁻⁴ Ωcm |
| Shore hardness | 79 |

EXAMPLE 6

A pitch having a softening point of 150° C was prepared from a tar by-product from the thermal cracking of crude oil at elevated temperatures. This pitch was extruded through nozzles 0.1 mm in diameter and taken up on a roll to produce filaments measuring 20 $\mu$ in diameter. The filaments were immersed in methanol at 40° C for 5 hours and then dried in air to have their softening point elevated to 280° C. Subsequently, the filaments were heated instantaneously to 285° C, in the form of a fixed bed having a void ratio of 80% by volume, with an inert gas current ($N_2$ fed at the rate of 10 liters/min.) and left to stand at 285° C for 30 minutes. Then, introduction of air was started to control the total oxygen content of the mixed system at 4% by volume, so that the filaments were subjected to an oxidizing treatment for five minutes. At the end of the oxidizing treatment, the introduction of air was stopped and the filaments were heated up to 400° C at a temperature increase rate of 180° C/hour with the $N_2$ current and allowed to stand at that temperature for two hours, with the result that the crystalloidal content attained full growth. The filaments were bound together, oriented and again heated to 1000° C at a temperature increase rate of 180° C/hour. X-ray analysis revealed that the filaments thus obtained showed an orientation degree of 80%. By an additional heat treatment (carried out at 2400° C), the filaments were improved in orientation degree to 90%. At this point, the filaments were found to have a specific gravity of 2.15.

EXAMPLE 7

A pitch having a softening point of 170° C was prepared from a tar by-product from the thermal cracking of crude oil at elevated temperatures. From this pitch, pitch fibers measuring 10 μ in average diameter were obtained by the melting method. The pitch fibers were subjected to an extraction treatment with acetone at 40° C for 5 hours to be stripped of low-melting components. Consequently, there were obtained pitch fibers having a softening point of 370° C. In a column-type heater, the fibers were heated to 100° C, in the form of a fixed bed having a void ratio of 80% by volume, by nitrogen gas at a temperature increase rate of 100° /hour. The fibers were free from mutual fusion and measured 7 μ in average diameter. Observation of the fibers under a polarizing microscope revealed that the crystals were arranged in the direction of the major axis relative to the direction of length and in the form of concentric circles relative to the cross section taken in the diametric direction.

What is claimed is:

1. A process for converting pitch to a crystalloid, which process comprises:
    a. providing a bed of solid amorphous pitch particles, said particles being not more than 5 mm in cross-sectional equivalent diameter, said bed having a gas void space of not less than 30% by volume;
    b. treating the surfaces of said pitch particles in said bed by coating, oxidation or solvent extraction to reduce susceptibility to cohesion; and
    c. contacting said particles in said bed with a hot non-oxidative gas to heat said particles to a temperature within the range of from 350°–550° C and convert the pitch to the crystalloidal state.

2. The process of claim 1 wherein said treatment for reducing susceptibility to cohesion is by coating the surface of the pich particles with a metal, metal salt, or thermosetting resin prior to contact with said non-oxidative gas.

3. The process of claim 1 wherein said treatment for reducing susceptibility to cohesion is by oxidizing the surfaces of said particles.

4. The process of claim 1 wherein said treatment for reducing susceptibility to cohesion is by extracting low-boiling components or low-melting components from said pitch particles.

5. The process of claim 3 additionally comprising extracting low-boiling components or low-melting components from said solid pitch particles by contacting said particles with a solvent.

6. The process of claim 2 wherein said metal is copper, chromium, nickel, or silver.

7. The process of claim 2 wherein said metal salt is a chloride of nickel, iron, or aluminum.

8. The process of claim 2 wherein said thermosetting resin is a phenolic resin, a furan resin, or an epoxy resin.

9. The process of claim 3 wherein said oxidizing is accomplished by contacting said pitch particles with at least one oxidative gas.

10. The process of claim 5 wherein said oxidizing is accomplished by contacting said pitch particles with at least one oxidative gas.

11. The process of claim 9 wherein said oxidative gas is oxygen, ozone, an oxide of sulfur, an oxide of nitrogen, or a halogen.

12. The process of claim 10 wherein said oxidative gas is oxygen, ozone, an oxide of sulfur, an oxide of nitrogen, or a halogen.

13. The process of claim 9 wherein said oxidative gas is diluted with an inert gas selected from the group consisting of nitrogen, argon, steam, and complete-combustion gas.

14. The process of claim 13 wherein said inert gas is selected from the group consisting of nitrogen, argon, steam, and complete-combustion gas.

15. The process of claim 3 wherein said oxidizing is by contacting said pitch particles with an oxidizing agent selected from the group consisting of hydrogen peroxide, chlorides, hypochlorites, perchlorates, nitric acid, ferric chloride, dichromates, acids, permanganates, and peracetates.

16. The process of claim 5 wherein said oxidizing is by contacting said pitch particles with an oxidizing agent selected from the group consisting of hydrogen peroxide, chlorides, hypochlorites, perchlorates, nitric acid, ferric chloride, dichromates, acids, permanganates, and peracetates.

17. The process of claim 4 wherein said solvent is selected from the group consisting of acetone, methyl-ethyl ketone, benzene, toluene, hexane, heptane, cyclohexane, methyl alcohol, chloroform, carbon tetrachloride and mixtures thereof.

18. The process of claim 5 wherein said solvent is selected from the group consisting of acetone, methyl-ethyl ketone, benzene, toluene, hexane, heptane, cyclohexane, methyl alcohol, chloroform carbon tetrachloride and mixtures thereof.

19. The process of claim 1 wherein said non-oxidative gas is nitrogen, argon, hydrogen, steam or a complete-combustion gas.

20. The process of claim 1 wherein the particles are fluidized by the hot non-oxidative gas.

21. The process of claim 1 wherein said amorphous pitch has a softening point of not less than about 70° C.

22. The crystalloidal pitch obtained by the process of claim 1.

* * * * *

UNITED STATES PATENT AND TRADEMARK OFFICE
CERTIFICATE OF CORRECTION

PATENT NO. : 4,042,486
DATED : August 16, 1977
INVENTOR(S) : KIRO ASANO ET AL

It is certified that error appears in the above-identified patent and that said Letters Patent are hereby corrected as shown below:

Column 1, line 43, change "from" to --form--;

line 50, should read --crystalloidal pitch is difficult to attain by the prior art method.--;

line 51, delete "attain.";

line 56, change "some" to --same--.

Column 6, line 47, change "surface" to --surfaces--;

line 60, change "110" to --1100--.

Column 10, line 7, change "fromed" to --formed--.

Column 11, line 39, change "pich" to --pitch--.

Signed and Sealed this

Twenty-seventh Day of December 1977

[SEAL]

Attest:

RUTH C. MASON
Attesting Officer

LUTRELLE F. PARKER
Acting Commissioner of Patents and Trademarks